C. A. HARPMAN.
DIRECTION INDICATOR FOR VEHICLES.
APPLICATION FILED APR. 15, 1918.
1,312,537.  Patented Aug. 12, 1919.
2 SHEETS—SHEET 1.
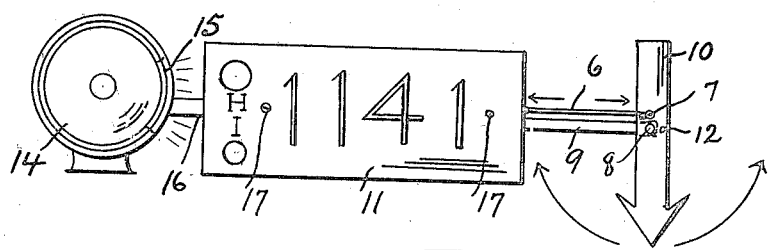
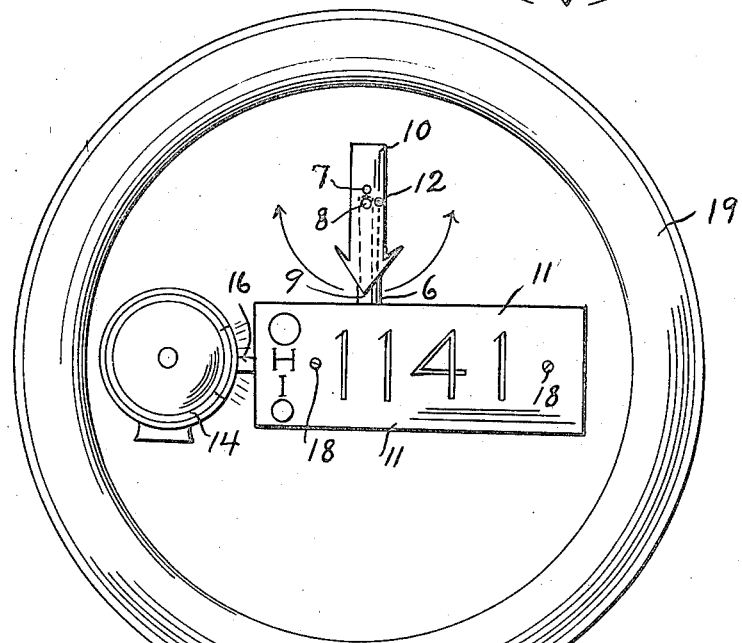
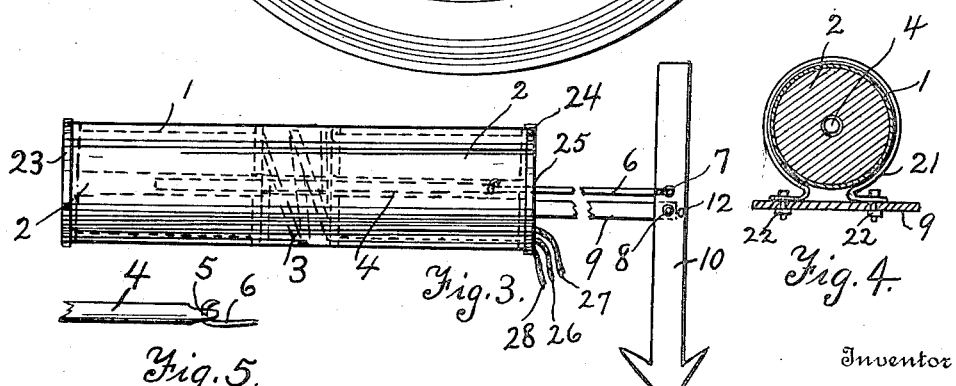
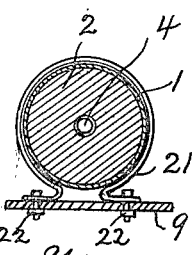
Inventor
C. A. Harpman
By
C. A. Harpman
Attorney C. A. HARPMAN.
DIRECTION INDICATOR FOR VEHICLES.
APPLICATION FILED APR. 15, 1918.

1,312,537.

Patented Aug. 12, 1919.
2 SHEETS—SHEET 2.

Inventor
C. A. Harpman

By
C. A. Harpman
Attorney

UNITED STATES PATENT OFFICE.

CHARLES A. HARPMAN, OF YOUNGSTOWN, OHIO.

DIRECTION-INDICATOR FOR VEHICLES.

1,312,537.   Specification of Letters Patent.   Patented Aug. 12, 1919.

Application filed April 15, 1918. Serial No. 228,556.

*To all whom it may concern:*

Be it known that I, CHARLES A. HARPMAN, a citizen of the United States, residing at Youngstown, in the county of Mahoning and State of Ohio, have invented certain new and useful Improvements in Direction-Indicators for Vehicles, of which the following is a specification.

This invention relates to a direction indicator for vehicles and has for its principal object the providing of a cheaply constructed, simple and efficient device by means of which the operator of the vehicle, such for instance as an automobile, may easily indicate the direction in which he is about to turn the vehicle.

Another object of this invention is the providing of a device wherein the indicator is adapted to be run or operated by electrically controlled means so that the operator of the vehicle may easily cause the indicator to be shifted in a desired direction for providing a sufficient and desired warning when necessary.

Another object of this invention is the manner in which the indicator hand is operated whereby the device may be attached so as to utilize a rear lamp already installed upon a vehicle.

A still further object is to provide a connecting rod operating the hand whereby the same may be attached to the hand in such a way when installed directly opposite the lamp and license number or when installed above or below the license number.

With these and other objects in view this invention consists of certain novel combinations, constructions, and arrangements of parts as will be hereinafter fully described and claimed.

In the accompanying drawing:

Figure 1 is a front elevation of the device showing the indicator hand at the end of the license number.

Fig. 2 is a front elevation of the device showing the indicator hand installed above the license number.

Fig. 3 is an elevational view of the device in assembled formation.

Fig. 4 is a cross section of the device showing method of mounting same.

Fig. 5 is a detail view showing a portion of a common core and indicator operating rod.

Fig. 6 is a front elevation of the device showing the indicator hand operated below the license number.

Fig. 7 is a diagrammatic view of the wiring used for operating the direction indicator.

Referring to the accompanying drawing by numerals it will be seen that the direction indicator for vehicles comprises a tube 1 containing solenoids 2, each solenoid being held at the ends of the tube 1 by means of coil spring 3 inserted within the tube 1 between the two solenoids 2. A core 4, common to both solenoids 2, is formed to reciprocate back and forth. This core 4 is provided at one end with an opening 5 into which is fastened an end of an operating rod 6, said arm being made of any non-conducting material, the other end of said arm being loosely fastened to an indicator hand 10 at opening 7. When the solenoid container 1 is mounted horizontally it will be seen that when the common core 4 is caused to be pulled into the right solenoid it will swing the indicator hand 10 to the left, turning the hand upon a pivot 8 which is fastened to a support arm 9. When the common core 4 is caused to be pulled into the left solenoid it will swing the indicator hand 10 to the right. See Fig. 3.

When the solenoid container 1 is mounted perpendicularly as shown in Fig. 2 where the indicator hand 10 is mounted above the license number 11 the operating arm 6 is connected with the indicator hand 10 at point 12 and causes the hand 10 to swing to the right or left as the common core 4 is pulled into the upper or lower solenoid respectively. See Fig. 2. When the indicator hand 10 can be best shown because of a lamp 13 reflecting light downwardly upon the license number 11 the device is mounted in reverse order from that shown in Fig. 2 so that the indicator hand 10 is below the said license number 11. As the common core 4 is pulled into the lower solenoid the indicator hand 10 is caused to swing to the left and when the common core 4 is pulled into the upper solenoid the indicator hand 10 is caused to swing to the right.

By referring to Fig. 1 it will be seen that the license number 11 is illuminated by a lamp 14 having a side opening 15 mounted upon a support arm 16 which in turn holds the license number 11 by means of bolts 17.

By referring to Fig. 2 the same lamp 14 is fastened to a support arm 16 which in turn holds the license number 11 by means of bolts 18.

Fig. 1 shows a lamp and license number as quite commonly mounted at the rear of a vehicle. In Fig. 2 is shown a lamp and license number as commonly mounted where an extra tire 19 is carried.

Figure 6:
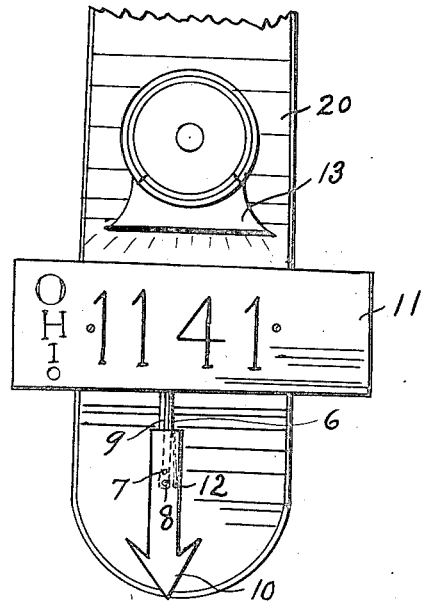
Fig. 6 shows a lamp and license number when mounted to rear fender of a vehicle.

By referring to Fig. 4 the support clamp 21 is shown attached to the arm 9 by means of bolts 22.

By referring to Fig. 3 the manner of assembling the device may be seen. The solenoid container 1 is provided with a cap 23. The left solenoid is slipped into this container 1, following this the coil spring 3 is inserted. The right solenoid is then inserted. A cap 24 then closes the right end of the container 1. This cap has a central opening 25 into which is inserted the core 4 and end of operating arm 6. Near the circumference of the cap 24 there is another opening through which the electric wires 26, 27 and 28 are threaded before the cap 24 is fastened.

Figure 7:
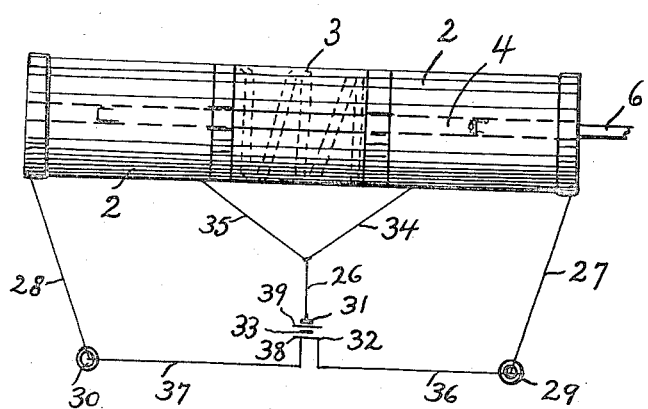

By referring to Fig. 7 it will be seen that switches 29 and 30 have been provided. These switches may be arranged on the dash or steering wheel of a vehicle.

By pressing the switch 29 a current is passed through the right solenoid 2 the current passing over the wires 27, 36, post 32 and 31 of a battery 33, wire 26 and wire 34 back into the right solenoid.

By pressing the switch 30 a current is passed through the left solenoid 2 the current passing over the wire 28, 37, posts 38 and 39 of the battery 33, over wires 26 and 35 back into the left solenoid.

While I have illustrated two push button switches 29 and 30 it will of course be understood that a single switch may be employed in the form of the ordinary lever switch movable to one side or the other of the given point for the purpose of throwing into the circuit either one of the electromagnets.

By referring to Figs. 1, 2 and 6 it will be seen that my invention has for one of its purposes the utilizing of ordinary tail lights as differently mounted to illuminate the hand by night. It is obvious that those skilled in the art may vary the details of construction, as well as the arrangement of parts without departing from the spirit of my invention and therefore I do not wish to be limited to the above disclosure except as may be required by the claims.

I claim:

1. A signaling device for vehicles comprising a support arm secured upon the vehicle; a tubular solenoid container secured to said support arm, solenoid within each end of said container, a common core reciprocating in said solenoids, provided with a hole at one end, an operating rod attached at said hole, a signaling arrow pivotally mounted upon the support arm above mentioned, said signaling arrow provided with two small openings spaced at right angles from the pivot point, the above mentioned operating arm adapted to be connected at either of said openings, means for energizing said solenoids, substantially as described for the purpose set forth.

2. In a device of the class described the combination of a support arm, a tubular container attached thereto, two solenoids contained therein spaced apart by means of a coil spring, a common core reciprocating in said solenoids, an operating arm attached to one end of said common core, an indicating arrow pivotally mounted upon above mentioned support arm, said arrow having two small openings spaced at right angles from the pivot point, said operating arm attached to said arrow at either of said openings, means for energizing said solenoids substantially as described for the purpose set forth.

In testimony whereof I affix my signature in the presence of two witnesses.

CHARLES A. HARPMAN.

Witnesses:
   JOHN A. FITHIAN,
   CLARA HINDSON.